(12) United States Patent
Lataille et al.

(10) Patent No.: US 7,925,868 B2
(45) Date of Patent: Apr. 12, 2011

(54) SUPPRESSING REGISTER RENAMING FOR CONDITIONAL INSTRUCTIONS PREDICTED AS NOT EXECUTED

(75) Inventors: Norbert Bernard Eugéne Lataille, Le Cannet (FR); Florent Begon, Antibes (FR); Cédric Denis Robert Airaud, Saint Laurent Due Var (FR); Mélanie Vincent, Grasse (FR)

(73) Assignee: ARM Limited, Cambridge (GB)

( * ) Notice: Subject to any disclaimer, the term of this patent is extended or adjusted under 35 U.S.C. 154(b) by 480 days.

(21) Appl. No.: 11/657,135

(22) Filed: Jan. 24, 2007

(65) Prior Publication Data

US 2008/0177984 A1    Jul. 24, 2008

(51) Int. Cl.
*G06F 9/00*    (2006.01)
(52) U.S. Cl. .................. 712/217; 712/229; 712/239
(58) Field of Classification Search .............. 712/217, 712/219, 233, 239, 220, 229, 234
See application file for complete search history.

(56) References Cited

U.S. PATENT DOCUMENTS

| 5,784,589 A * | 7/1998 | Bluhm ........................... 712/217 |
| 6,170,052 B1 * | 1/2001 | Morrison ....................... 712/236 |
| 2005/0120191 A1 * | 6/2005 | Akkary et al. ................ 712/217 |

OTHER PUBLICATIONS

ARM Limited, "ARM Architecture Reference Manual", 2005, pp. A4-36,37.*

* cited by examiner

*Primary Examiner* — David J Huisman
(74) *Attorney, Agent, or Firm* — Nixon & Vanderhye P.C.

(57) ABSTRACT

Within a data processing system including a register renaming mechanism, register renaming for some conditional instructions which are predicted as not-executed is suppressed. The conditional instructions which are subject to such suppression of renaming may not be all conditional instructions, but may be those which are known to consume a particularly large number of physical registers if they are subject to renaming A conditional load multiple instruction in which multiple registers are loaded with new data values taken from memory in response to a single instruction is an example where the present technique may be used, particularly when one of the registers loaded is the program counter and accordingly the instruction is a conditional branch.

16 Claims, 3 Drawing Sheets

SUPPRESSING REGISTER RENAMING FOR CONDITIONAL INSTRUCTIONS PREDICTED AS NOT EXECUTED

TECHNICAL FIELD

This invention relates to the field of data processing systems. More particularly, this relates to data processing systems using register renaming.

BACKGROUND

It is known to provide data processing systems utilizing the technique of register renaming. In such systems there exists a pool of physical registers which can be mapped to architectural registers as specified within instructions of the instruction set of the data processing system concerned. One example use of such register renaming techniques is to facilitate out-of-order processing. In this context, register renaming allows the system to cope with write-after-write hazards and write-after-read hazards and provide a mechanism for recovering architectural state should processing not proceed as predicted, e.g. as a consequence of a mis-predicted branch instruction, as a consequence of an abort, or some other exception.

It will be appreciated that one feature of such register renaming techniques is that more physical registers are provided than there are architectural registers which may be specified. As the degree of speculation increases and the parallelism increases, then there is a general increase in the required number of physical registers in order that this should not become a limiting factor. As an example, if an instruction requires renaming but all of the physical registers provided are already in use for other mappings, then the instruction concerned cannot be subject to register renaming, and the processing will stall until physical registers become available. One solution to this is to increase the number of physical registers provided. However, this solution disadvantageously increases the circuit area and power consumption of the system concerned.

It is known within data processing systems to provide instructions within an instruction set that are conditional upon the outcome of preceding instructions. This is often achieved by associating condition codes with a particular instruction. The condition codes are set by preceding processing outcomes and then the instruction concerned is executed if the condition codes which are in effect at the time the instruction has its condition codes checked indicate that the condition codes associated with the instruction have been passed. An example of such instructions are the instructions of the ARM instruction set used by processors designed by ARM Limited Cambridge England. The ARM instructions have a four bit condition code associated with them which specify conditions upon which they are to be executed, e.g. execute if the zero flag is set.

SUMMARY

Viewed from one aspect the present invention provides apparatus for processing data, said apparatus comprising:
 a physical set of registers;
 register renaming circuitry for mapping from register specifiers of an architectural set of register specifiers to registers of said physical set of registers, said architectural set of register specifiers representing registers as specified by instructions within an instruction set and said physical set of registers being physical registers for use in executing instructions of said instruction set;
 prediction circuitry responsive to at least one instruction of said instruction set to be subject to mapping by said register renaming circuitry to generate a prediction for said instruction as one of:
  (i) an executed prediction being a prediction that said instruction will be executed;
  (ii) a not-executed prediction being a prediction that said instruction will not be executed;
 renaming control circuitry responsive to a not-executed prediction for an instruction to suppress said register renaming circuitry performing a mapping for said instruction;
 prediction resolving circuitry responsive to an execution outcome for said instruction to determine if said prediction is correct or is incorrect; and
 recovery circuitry responsive to said not-executed prediction for said instruction being incorrect to control said register renaming circuitry to perform said mapping for said instruction and to reverse any incorrect changes of architectural state consequent upon said not-executed prediction for said instruction being incorrect.

The present technique recognizes that prediction mechanisms may be used to generate a prediction as to whether or not a particular conditional instruction will or will not be executed and then register renaming for a conditional instruction predicted to be not executed can be suppressed thereby preserving physical register resources such these are available for use in connection with the processing of other program instructions. If the prediction is accurate, then the conditional instruction will not be executed and the fact that it was not subject to renaming will have no impact. If the prediction turns out to be incorrect, then a recovery mechanism can be used to recover the situation such that inappropriate changes to architectural state are reversed and the conditional instruction concerned forced to be subject to renaming and then reissued for execution. When the prediction accuracy is high and the cost in terms of physical register usage by renaming a conditional instruction which will not be executed is high, then the present technique is justified and provides an advantageous balance between overhead and performance.

Whilst it will be appreciated that the present technique of suppressing register renaming for some or all conditional instructions can be provided for conditional instructions in general, some embodiments concentrate on particular instructions where the benefit of using this technique is high. An example of such instructions are conditional branch instructions. If a conditional branch instruction is predicted as not-executed (i.e. the branch not taken), then any register renaming associated with it can be suppressed and accordingly physical register resources preserved.

In connection with such conditional branch instructions it will be appreciated that it is known within systems to already provide branch prediction mechanisms so as to predict program flow and keep the instruction pipeline full with the correct sequence of instructions. In order to achieve this, various sophisticated branch prediction mechanisms are already provided, typically in association with a pre-fetch unit, and these branch prediction mechanisms can be highly accurate. In this context, the present technique is able to reuse the branch prediction mechanisms which are already provided and exploit the predictions which they make for the additional purpose of suppressing register renaming associated with conditional branch instructions which are predicted as not executed.

Whilst it will be appreciated that conditional branch instructions can take a wide variety of different forms, one particular form with which the present technique can be used involves load multiple instructions serving to load data values into a plurality of physical registers, including a physical register serving as a program counter register such that program flow is redirected by execution of the load multiple instruction.

Such load multiple instructions can consume a large number of physical registers if they are subject to renaming and thus suppressing renaming in respect of such load multiple instructions which are predicted as not-executed is particularly beneficial.

In this context, it may be appropriate to not suppress remapping in respect of conditional branch instructions other than said load multiple instruction since the additional control complexity which would be involved would not justify the saving in physical register resources for such other types of conditional branch instruction.

The conditional instructions could take a wide variety of different forms, as an example, a predication instruction may be associated with one or more following instructions and render those one or more following instructions conditional. As an alternative, the conditional instructions can have one or more condition codes associated therewith and set by one or more processing outcomes of one or more preceding instructions so as to control whether or not those instructions are executed or not executed.

In this context, the prediction resolving circuitry may be responsive to the one or more condition codes set by the one or more processing outcomes of one or more preceding instructions to determine if the prediction which was previously made is or is not correct. This allows the prediction to be resolved in an advantageously straightforward manner.

When a not-executed prediction for an instruction is incorrect, then the recovery circuitry needs to trigger recovery action to ensure architectural state has not been corrupted and to correct the program flow. To this end, the recovery circuitry may be responsive to the not-executed prediction for the instruction being incorrect to flush an instruction pipeline, reverse any architectural state changes made by subsequent instructions, force the remapping of the mispredicted instruction and to reissue the mispredicted instruction.

Viewed from another aspect the present invention provides an apparatus for processing data, said apparatus comprising:
a physical set of registers;
register renaming means for mapping from register specifiers of an architectural set of register specifiers to registers of said physical set of registers, said architectural set of register specifiers representing registers as specified by instructions within an instruction set and said physical set of registers being physical registers for use in executing instructions of said instruction set;
prediction means for generating, in response to at least one instruction of said instruction set to be subject to mapping by said register renaming circuitry, a prediction for said instruction as one of:
  (i) an executed prediction being a prediction that said instruction will be executed;
  (ii) a not-executed prediction being a prediction that said instruction will not be executed;
renaming control means for suppressing, in response to a not-executed prediction for an instruction, said register renaming circuitry performing a mapping for said instruction;
prediction resolving means for determining, in response to an execution outcome for said instruction, if said prediction is correct or is incorrect; and
recovery means responsive to said not-executed prediction for said instruction being incorrect for controlling said register renaming circuitry to perform said mapping for said instruction and for reversing any incorrect changes of architectural state consequent upon said not-executed prediction for said instruction being incorrect.

Viewed from a further aspect the present invention provides a method of processing data, said method comprising the steps of:
mapping from register specifiers of an architectural set of register specifiers to registers of a physical set of registers, said architectural set of register specifiers representing registers as specified by instructions within an instruction set and said physical set of registers being physical registers for use in executing instructions of said instruction set;
in response to at least one instruction of said instruction set to be subject to mapping, generating a prediction for said instruction as one of:
  (i) an executed prediction being a prediction that said instruction will be executed;
  (ii) a not-executed prediction being a prediction that said instruction will not be executed;
in response to a not-executed prediction for an instruction, suppressing performance of a mapping for said instruction;
in response to an execution outcome for said instruction, determining if said prediction is correct or is incorrect; and
in response to said not-executed prediction for said instruction being incorrect, controlling said register renaming circuitry to perform said mapping for said instruction and reversing any incorrect changes of architectural state consequent upon said not-executed prediction for said instruction being incorrect.

The above, and other objects, features and advantages will be apparent from the following detailed description of illustrative embodiments which is to be read in connection with the accompanying drawings.

DETAILED DESCRIPTION

Figure 1:
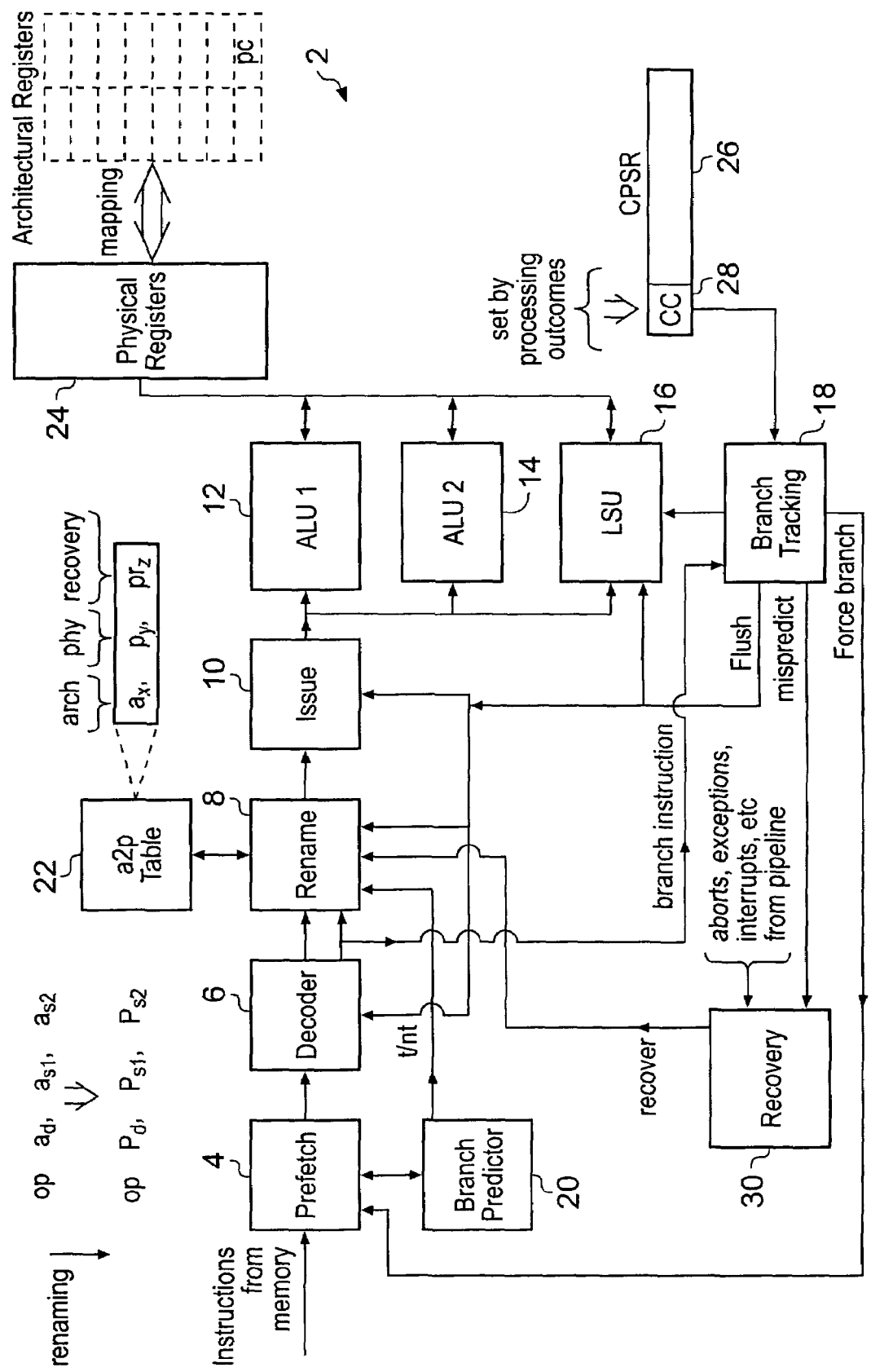
FIG. 1 schematically illustrates a data processing apparatus and the instruction pipelines therein.

FIG. 1 schematically illustrates a data processing apparatus 2, which will typically be formed as an integrated circuit containing a processor executing program instructions taken from an instruction set. The instruction set could take a variety of different forms, but may be the ARM instruction set of the type executed by processors provided by ARM Limited of Cambridge England. It will be appreciated that the data processing apparatus 2 will typically include many further elements beyond those illustrated in FIG. 1 but these have been omitted from FIG. 1 for the sake of simplicity.

FIG. 1 generally illustrates the instruction pipelines provided within the data processing system 2. In particular, the data processing system 2 includes a prefetch unit 4, a decoder 6, a renaming unit 8 and an issue unit 10. These are followed by two data processing units 12, 14, a load store unit 16 and a branch tracking unit 18. In operation program instructions from a memory (not illustrated) are fetched by the prefetch unit 4, decoded by the decoder 6, subject to register renaming by the renaming unit 8 and then subject to multiple out-of-order issue by the issue unit 10. It will be appreciated that in this type of system multiple program instructions can be issued in parallel and these instructions can be out-of-order, as is facilitated by the use of the register renaming technique.

Branch instructions are prefetched by the prefetch unit 4, decoded by the decoder 6 and then issued to the branch tracking unit 18 whereby their place within the program flow is monitored and it is determined at the point at which they are deemed to be architecturally executed whether or not they should be executed depending upon their condition codes (if applicable) and an indication is issued as to whether or not those branch instructions were mispredicted by a branch predictor 20 associated with the prefetch unit 4. Certain conditional branch instructions, such as load multiple instructions predicted not-executed have a branch portion issued from the decoder 6 to the branch tracking unit 18 as well as a load store portion which is issued along the rest of the pipeline 8,10 to the load store unit 16 where it is held until it has been determined whether or not that conditional branch instruction in the form of a conditional load multiple instruction is to be executed. In other embodiments the load store portion may not be issued.

In this example embodiment, the branch predictor 20 associated with the prefetch unit 4 takes the role of a conditional instruction predictor. The branch predictor 20 in this embodiment generates predicted outcomes of taken (executed) or not taken (not executed) for conditional branch instructions. There are a wide variety of different mechanisms and techniques that may be used by the branch predictor 20, as will be familiar to those skilled in this technical field. These different known techniques may be used individually or in combination to generate the predicted outcome of executed or not-executed, which is used to control the prefetching performed by the prefech unit 4 for supplying what is predicted to be the program flow instructions into the pipeline 4, 6, 8, 10 etc, as well as being used in accordance with the present technique to suppress register renaming by the renaming unit 8 for conditional load multiple instructions which are branch instructions (i.e. load a new value to a register serving as the program counter and accordingly redirect program flow) and are predicted as not-executed.

The renaming unit 8 is responsive to the prediction by the branch predictor 20 and the program instruction fed to it to identify from the program instruction fed to it whether the instruction concerned is a load multiple instruction, from the prediction that it is predicted as not-executed and as an instruction corresponding to a branch (i.e. it is loading to the program counter). In this combination of circumstances the normal register renaming action of the renaming unit 8 ($a_d$, $a_{s1}$, $a_{s2}$ mapped to $p_d$, $p_{s1}$, $p_{s2}$) is suppressed and physical registers are not mapped to the architectural registers specified by the load multiple instruction. The load multiple instruction is nevertheless passed along the remaining stages of the instruction pipeline, through the issue stage 10 to the load store unit 16 where it remains stalled until a resolution of its condition codes is made and accordingly it is determined whether or not the prediction associated with it is or is not correct. The architectural to physical table 22 associated with the renaming stage 8 stores data identifying the mappings being used between architectural and physical registers as well as recovery information indicating which physical registers are holding data values corresponding to previous contents of the architectural registers which are being overwritten based upon speculative execution such that recovery of those previous values and accordingly a recovery of architectural state may be made if the program flow has been mispredicted or some other unexpected event, such as a memory abort occurs. When the renaming unit 8 is suppressed from its renaming function, then physical registers taken from the pool of physical registers 24 are not allocated to the architectural registers specified by the instruction and updates are not made within the architectural to physical table 22. A load multiple instruction marked as not renamed may nevertheless be passed along the pipeline as a form of place holder and, in some circumstances, to facilitate the outcome resolving the process where it is determined whether or not the prediction made in respect of that instruction was or was not correct.

As is illustrated in FIG. 1, a current program and status register 26 is provided which includes within it condition code flags 28 set by the processing outcomes of program instructions as they are executed. These condition code flags may indicate the occurrence of events such as a zero result, and equal result, a carry etc. In dependence upon the setting of these condition codes 28 by preceding processing outcomes, a following instruction will or will not be executed as determined by the condition codes associated with that following instruction. If a load multiple instruction is predicted as not executed and when its condition codes are finally resolved this prediction turns out to be correct, then no recovery action is necessary and the place holder load store multiple instruction within the load store unit 16 will merely be discarded without being actioned. The branch tracking unit 18 will note that the branch not being taken as a consequence of the load store multiple being predicted as not-executed, i.e. a correct branch prediction was made and no recovery would be necessary.

If when the load store multiple instruction (which is a conditional branch instruction in this example) is mispredicted and should have been executed despite being predicted as not-executed, then this is detected by the branch tracking unit 18 and then this then triggers recovery actions. One recovery action is to flush the instruction pipeline, and this done by sending flush signals to the decoder 6, the renaming unit 8, the instruction issue unit 10 and the load store unit 16. In this example, the data processing units 12, 14 do not require flushing as they do not hold state after the one processing cycle in which they operate. A mispredict signal is also supplied to recovery unit 30, which in turn controls the renaming unit 8 to perform a recovery operation whereby the mapping data and the recovery register information stored within the architectural to physical table 22 is accessed so as to restore the architectural state of the data processing system 2. As an example, if a program instruction subsequent to the mispredicted load store multiple instruction wrote to a register, then the architectural to physical table 22 will have stored a pointer to a physical register within the pool of physical registers 24 storing the preceding data value for that architectural register and that physical register with its data value will have been preserved from being overwritten such that if the recovery operation is necessary, as the subsequent instruction should not in fact have been executed, then the architectural state can be restored merely by pointing to (i.e. amending the mapping) that previously used physical register as now containing the true value for the architectural register concerned. This type of recovery mechanism is provided within data processing systems supporting register renaming and accordingly this present technique is able to provide its additional functionality of recovering from incorrectly suppressed renaming for program instructions with a relatively small amount of additional control complexity. The branch tracking unit 18 will also issue a force branch signal to the prefetch unit 4 to indicate that the mispredicted load store multiple instruction should be treated as an executed branch and then this load store multiple instruction will be reissued along the instruction pipeline.

Figure 2:
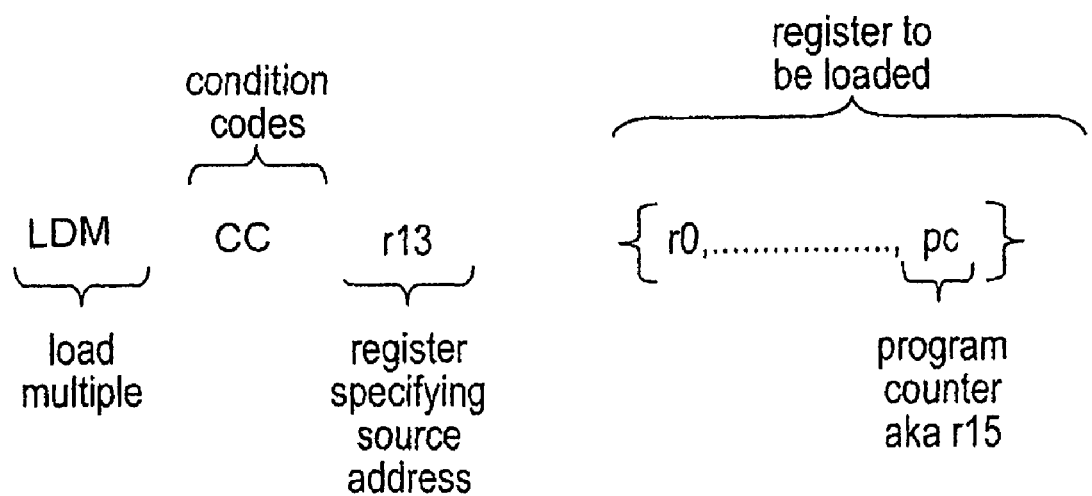
FIG. 2 schematically illustrates a load multiple instruction.

FIG. 2 schematically illustrates a load multiple instruction of the type provided by the ARM instructions previously discussed. This load multiple instruction is indicated by the LDM mnemonic. Condition codes (cc) associated with the instructions specify the conditions under which that load multiple instruction should be executed. A register r13 specifies a source address starting from which data values are to be read and supplied into the list of a plurality of architectural register specifiers in the remainder of the instruction. These architectural registers specifiers in the remainder of the instruction in this example include the register r15 which serves as the program counter register. Accordingly, a load to this program counter register r15 will cause a branch operation and redirect program flow. The condition codes render this a conditional branch instruction.

Figure 3:
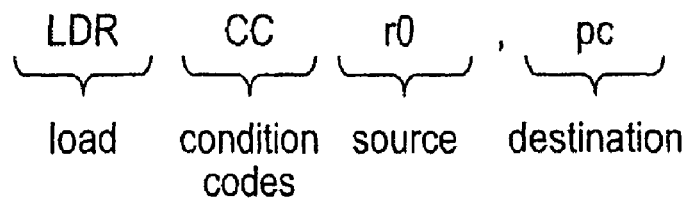
FIG. 3 schematically illustrates a conditional branch instruction.

FIG. 3 illustrates a conditional branch instruction of a type which is not subject to the present technique. This conditional branch instruction is in the form of a load register instruction for a single register in which the contents of a source register r0 are loaded to the program counter register r15 (pc) subject to the condition codes being passed for that instruction. Since this conditional branch instruction only specifies one register as its destination, only one physical register is consumed by renaming associated with the instruction of FIG. 3. Accordingly, the benefit for suppressing the renaming operation associated with the instruction of FIG. 3 is significantly less than that for the instruction of FIG. 2. In the instruction of FIG. 2, up to all of the architectural registers (e.g. sixteen registers in the case of the ARM instruction set) may be specified as destinations and accordingly this would consume a significant proportion of the pool of physical registers 24 available. Furthermore, this type of conditional load multiple instruction is statistically common as it is a convenient way for returning from a procedure call and restoring preceding state with the source address specifying register in this case typically being a pointer to a stack memory location. The relatively frequent occurrence of such conditional load multiple instructions resulting in a branch and the high number of physical registers consumed by their renaming renders it advantageous specifically to suppress their renaming when such instructions are predicted as not executed.

Figure 4:
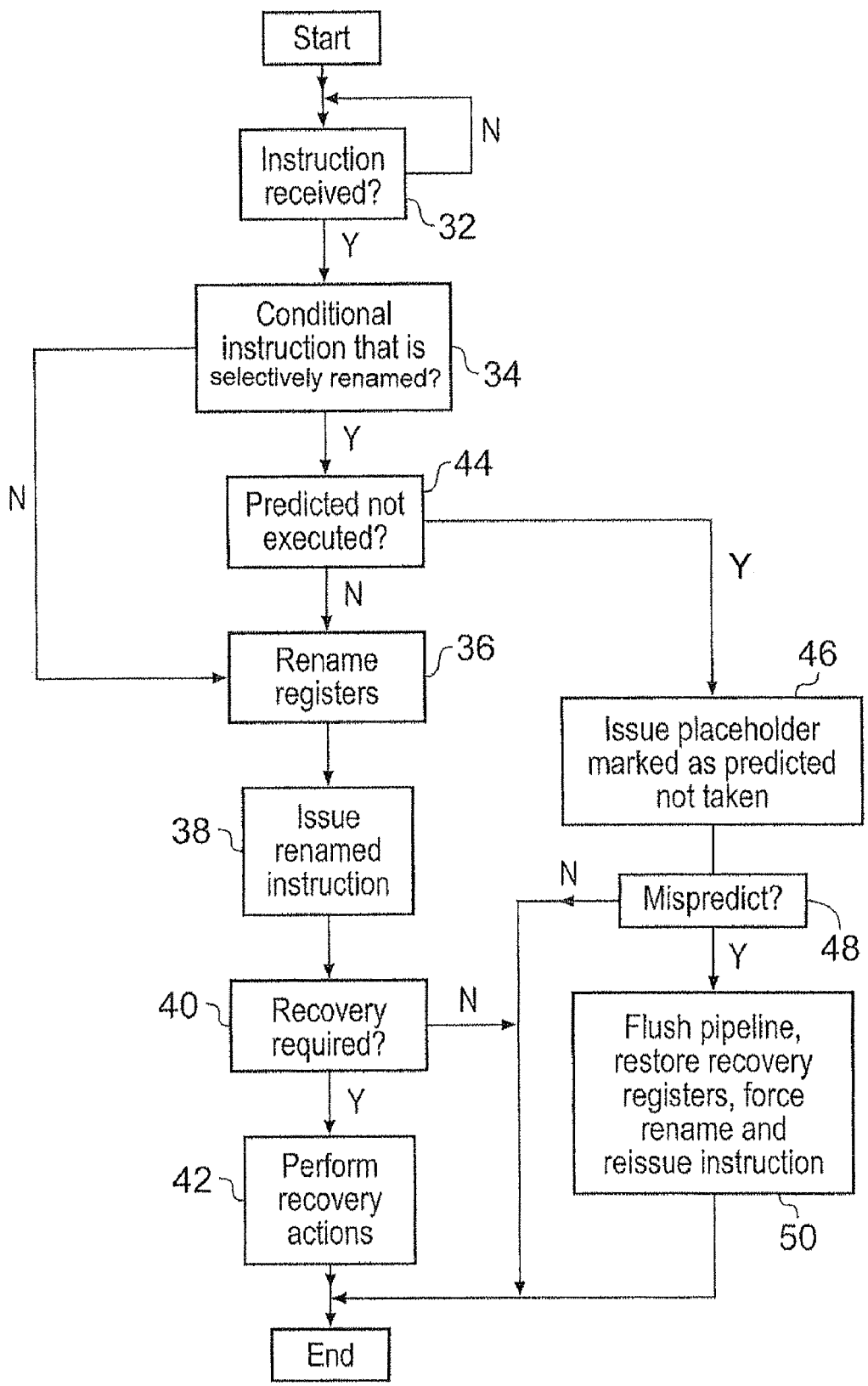
FIG. 4 is a flow diagram schematically illustrating the processing associated with suppressing register renaming in respect of certain conditional instructions that are predicted as not executed.

FIG. 4 is a flow diagram illustrating the suppression of register renaming for certain conditional instructions which are predicted as not executed. At step 32, processing waits for an instruction to be received. At step 34, a determination is made as to whether or not the type of instruction concerned is one that is selectively subject to renaming depending upon whether or not it is predicted as being executed. If the instruction received is not of this type, then processing proceeds to step 36 at which register renaming is performed. The instruction is then issued in its renamed form at step 38. Step 40 determines whether a recovery operation is needed in association with that renamed instruction (e.g. associated with an unexpected processing outcome such as an abort) and, if such recovery is necessary, then this is performed at step 42. If recovery is not necessary, then step 42 is bypassed and the processing ends.

If the determination at step 34 was that the instruction received at step 32 is a conditional instruction of the type which is to be selectively renamed (in this particular example embodiment a conditional load multiple instruction including the program counter as a destination register), then step 44 determines whether or not the particular instruction is predicted as not-executed. If the prediction indicates that the instruction will be executed, then processing proceeds to step 36 and then in accordance with the above. If the prediction at step 44 is that the instruction will not be executed, then processing proceeds to step 46 at which a place holder is issued into the pipeline (which has not been subject to register renaming) and is marked as an instruction which has been predicted as not-executed and that requires special handling.

Step 48 determines for such instructions requiring special handling whether or not they have been subject to misprediction. If misprediction has not occurred, then processing terminates as the instruction is not required to execute when it is resolved as this was correctly identified at the stage of prediction. However, if a misprediction is detected at step 48, then processing proceeds to step 50 at which recovery actions are taken. In this example, the recovery reactions include flushing the instruction pipeline (or at least the relevant stages thereof), restoring values from recovery registers as held within the architectural to physical table 22, and forcing renaming and reissue of the mispredicted instruction to take place, such that next time it can be properly executed using the physical registers which have been allocated to it through the renaming process.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. An apparatus for processing data, said apparatus comprising:
   a physical set of hardware registers;
   an instruction pipeline for concurrently processing a plurality of program instructions;
   register renaming circuitry for mapping from register specifiers of an architectural set of register specifiers to registers of said physical set of registers, said architectural set of register specifiers representing registers as specified by instructions within an instruction set and said physical set of registers being physical registers for use in executing instructions of said instruction set;
   prediction circuitry comprising a branch predictor responsive to a conditional branch instruction of said instruction set to be subject to mapping by said register renaming circuitry to generate a prediction for said conditional branch instruction as one of:
      (i) an executed prediction being a prediction that said conditional branch instruction will be executed and result in a taken branch;
      (ii) a not-executed prediction being a prediction that said conditional branch instruction will not be executed and will result in a not taken branch, said conditional branch instruction being processed by said instruction pipeline regardless of whether said executed prediction or said not-executed prediction is generated by said branch predictor;
   renaming control circuitry responsive to said not-executed prediction for said conditional branch instruction to suppress said register renaming circuitry performing a mapping for a register specified by said conditional branch instruction being processed by said instruction pipeline;
   prediction resolving circuitry responsive to an execution outcome for said conditional branch instruction to determine if said prediction is correct or is incorrect; and recovery circuitry responsive to said not-executed prediction for said conditional branch instruction being incorrect to control said register renaming circuitry to perform said mapping for said conditional branch instruction and to reverse any incorrect changes of architectural state consequent upon said not-executed prediction for said conditional branch instruction being incorrect.

2. An apparatus as claimed in claim 1, wherein said conditional branch instruction comprises a load multiple instruction, and execution of said load multiple instruction serves to load data values into a plurality of physical registers including a physical register serving as a program counter register such that program flow is redirected by execution of said load multiple instruction.

3. An apparatus as claimed in claim 2, wherein said branch predictor used for said load multiple instruction also generates predictions for other conditional branch instructions for which said renaming control circuitry does not suppress register renaming circuitry performing a mapping.

4. An apparatus as claimed in claim 1, wherein said recovery circuitry is responsive to said not-executed prediction for said conditional branch instruction being incorrect to:
flush said instruction pipeline of subsequent instructions following said conditional branch instruction;
reverse any changes of architectural state made by said subsequent instructions;
control said register renaming circuitry to perform said mapping for said conditional branch instruction; and
reissue said conditional branch instruction to said instruction pipeline.

5. An apparatus for processing data, said apparatus comprising:
a physical set of hardware registers;
an instruction pipeline means for concurrently processing a plurality of program instructions;
register renaming means for mapping from register specifiers of an architectural set of register specifiers to registers of said physical set of registers, said architectural set of register specifiers representing registers as specified by instructions within an instruction set and said physical set of registers being physical registers for use in executing instructions of said instruction set;
prediction means for generating, in response to a conditional branch instruction of said instruction set to be subject to mapping by said register renaming circuitry, a prediction for said conditional branch instruction as one of:
(i) an executed prediction being a prediction that said conditional branch instruction will be executed and result in a taken branch;
(ii) a not-executed prediction being a prediction that said conditional branch instruction will not be executed and will result in a not-taken branch, said conditional branch instruction being processed by said instruction pipeline means regardless of whether said executed prediction or said not-executed prediction is generated by said prediction means;
renaming control means for suppressing, in response to said not-executed prediction for said conditional branch instruction, said register renaming means performing a mapping for a register specified by said conditional branch instruction being processed by said instruction pipeline means;

prediction resolving means for determining, in response to an execution outcome for said conditional branch instruction, if said prediction is correct or is incorrect; and
recovery means responsive to said not-executed prediction for said conditional branch instruction being incorrect for controlling said register renaming means to perform said mapping for said conditional branch instruction and for reversing any incorrect changes of architectural state consequent upon said not-executed prediction for said conditional branch instruction being incorrect.

6. A method of processing data, said method comprising the steps of:
mapping from register specifiers of an architectural set of register specifiers to registers of a physical set of registers, said architectural set of register specifiers representing registers as specified by instructions within an instruction set and said physical set of registers being physical registers for use in executing instructions of said instruction set;
in response to a conditional branch instruction of said instruction set to be subject to mapping, generating a prediction for said conditional branch instruction as one of:
(i) an executed prediction being a prediction that said conditional branch instruction will be executed and result in a taken branch;
(ii) a not-executed prediction being a prediction that said conditional branch instruction will not be executed and will result in a not-taken branch, said conditional branch instruction being processed by an instruction pipeline for concurrently processing a plurality of program instructions regardless of whether said executed prediction or said not-executed prediction is generated;
in response to said not-executed prediction for said conditional branch instruction, suppressing performance of a mapping for said conditional branch instruction being processed by said instruction pipeline;
in response to an execution outcome for said conditional branch instruction, determining if said prediction is correct or is incorrect; and
in response to said not-executed prediction for said conditional branch instruction being incorrect, performing said mapping for a register specified by said conditional branch instruction and reversing any incorrect changes of architectural state consequent upon said not-executed prediction for said conditional branch instruction being incorrect.

7. A method as claimed in claim 6, wherein said conditional branch instruction comprises a load multiple instruction, and execution of said load multiple instruction serves to load data values into a plurality of physical registers including a physical register serving as a program counter register such that program flow is redirected by execution of said load multiple instruction.

8. A method as claimed in claim 7, wherein said step of predicting used for said load multiple instruction also generates predictions for other conditional branch instructions for which a mapping is not suppressed.

9. A method as claimed in claim 6, further comprising in response to said not-executed prediction for said conditional branch instruction being incorrect:
flushing said instruction pipeline of subsequent instructions following said conditional branch instruction;
reversing any changes of architectural state made by said subsequent instructions;

performing said mapping for said conditional branch instruction; and reissuing said conditional branch instruction to said instruction pipeline.

10. An apparatus for processing data, said apparatus comprising:

a physical set of hardware registers;

an instruction pipeline for concurrently processing a plurality of program instructions;

register renaming circuitry for mapping from register specifiers of an architectural set of register specifiers to registers of said physical set of registers, said architectural set of register specifiers representing registers as specified by instructions within an instruction set and said physical set of registers being physical registers for use in executing instructions of said instruction set;

prediction circuitry responsive to a conditional instruction of said instruction set to be subject to mapping by said register renaming circuitry, said conditional instruction having one or more conditional codes associated therewith and set by one or more processing outcomes of one or more preceding instructions, said prediction circuitry being responsive to said conditional instruction to generate a prediction for said conditional instruction as one of:
  (i) an executed prediction being a prediction that said conditional instruction will be executed, said executed prediction corresponding to said one or more condition codes being met;
  (ii) a not-executed prediction being a prediction that said instruction will not be executed, said not-executed prediction corresponding to said one or more condition codes not being met, said conditional instruction being processed by said instruction pipeline regardless of whether said executed prediction or said not-executed prediction is generated by said prediction circuitry;

renaming control circuitry responsive to said not-executed prediction for said conditional instruction to suppress said register renaming circuitry performing a mapping for a register specified by said conditional instruction being processed by said instruction pipeline;

prediction resolving circuitry responsive to an execution outcome for said conditional instruction to determine if said prediction is correct or is incorrect; and recovery circuitry responsive to said not-executed prediction for said conditional instruction being incorrect to control said register renaming circuitry to perform said mapping for said conditional instruction and to reverse any incorrect changes of architectural state consequent upon said not-executed prediction for said conditional instruction being incorrect.

11. An apparatus as claimed in claim 10, wherein said prediction circuitry is responsive to said one or more condition codes as set by said one or more processing outcomes of one or more preceding instructions to determine if said prediction is correct or is incorrect.

12. An apparatus as claimed in claim 10, wherein said recovery circuitry is responsive to said not-executed prediction for said conditional instruction being incorrect to:

flush said instruction pipeline of subsequent instructions following said conditional instruction;

reverse any changes of architectural state made by said subsequent instructions;

control said register renaming circuitry to perform said mapping for said conditional instruction; and reissue said conditional instruction to said instruction pipeline.

13. An apparatus for processing data, said apparatus comprising:

a physical set of hardware registers;

an instruction pipeline means for concurrently processing a plurality of program instructions;

register renaming means for mapping from register specifiers of an architectural set of register specifiers to registers of said physical set of registers, said architectural set of register specifiers representing registers as specified by instructions within an instruction set and said physical set of registers being physical registers for use in executing instructions of said instruction set;

prediction means for generating a prediction, in response to a conditional instruction of said instruction set to be subject to mapping by said register renaming means, said conditional instruction having one or more conditional codes associated therewith and set by one or more processing outcomes of one or more preceding instructions, said prediction for said conditional instruction being generated as one of:
  (i) an executed prediction being a prediction that said conditional instruction will be executed, said executed prediction corresponding to said one or more condition codes being met;
  (ii) a not-executed prediction being a prediction that said conditional instruction will not be executed, said not-executed prediction corresponding to said one or more condition codes not being met, said conditional branch instruction being processed by said instruction pipeline means regardless of whether said executed prediction or said not-executed prediction is generated by said prediction means;

renaming control means for suppressing, in response to said not-executed prediction for said conditional instruction, said register renaming circuitry performing a mapping for a register specified by said conditional instruction being processed by said instruction pipeline means;

prediction resolving means for determining, in response to an execution outcome for said conditional instruction, if said conditional prediction is correct or is incorrect; and recovery means responsive to said not-executed prediction for said conditional instruction being incorrect for controlling said register renaming circuitry to perform said mapping for said conditional instruction and for reversing any incorrect changes of architectural state consequent upon said not-executed prediction for said conditional instruction being incorrect.

14. A method of processing data, said method comprising the steps of:

mapping from register specifiers of an architectural set of register specifiers to registers of a physical set of registers, said architectural set of register specifiers representing registers as specified by instructions within an instruction set and said physical set of registers being physical registers for use in executing instructions of said instruction set;

in response to a conditional instruction of said instruction set to be subject to mapping, said conditional instruction having one or more conditional codes associated therewith and set by one or more processing outcomes of one or more preceding instructions, generating a prediction for said conditional instruction as one of:
  (i) an executed prediction being a prediction that said conditional instruction will be executed, said executed prediction corresponding to said one or more condition codes being met;

(ii) a not-executed prediction being a prediction that said conditional instruction will not be executed, said not-executed prediction corresponding to said one or more condition codes not being met, said conditional branch instruction being processed by an instruction pipeline for concurrently processing a plurality of program instructions regardless of whether said executed prediction or said not-executed prediction is generated;

in response to said not-executed prediction for said conditional instruction, suppressing performance of a mapping for a register specified by said conditional instruction being processed by said instruction pipeline;

in response to an execution outcome for said conditional instruction, determining if said prediction is correct or is incorrect; and in response to said not-executed prediction for said conditional instruction being incorrect, performing said mapping for said conditional instruction and reversing any incorrect changes of architectural state consequent upon said not-executed prediction for said conditional instruction being incorrect.

15. A method as claimed in claim 14, wherein said step of determining is responsive to said one or more condition codes as set by said one or more processing outcomes of one or more preceding instructions to determine if said prediction is correct or is incorrect.

16. A method as claimed in claim 14, further comprising in response to said not-executed prediction for said conditional instruction being incorrect:

flushing said instruction pipeline of subsequent instructions following said conditional instruction;

reversing any changes of architectural state made by said subsequent instructions;

performing said mapping for said conditional instruction; and reissuing said conditional instruction to said instruction pipeline.

* * * * *